United States Patent

[11] 3,619,269

| [72] | Inventors | James Eric McIntyre;<br>Michael Mundie Robertson, both of Harrogate, England |
|---|---|---|
| [21] | Appl. No. | 777,877 |
| [22] | Filed | Nov. 21, 1968 |
| [23] | | Division of Ser. No. 370,068, May 25, 1964, Pat. No. 3,416,952 |
| [45] | Patented | Nov. 9, 1971 |
| [73] | Assignee | Imperial Chemical Industries Limited London, England |
| [32] | Priorities | June 5, 1963 |
| [33] | | Great Britain |
| [31] | | 22,323/63;<br>Oct. 31, 1963, Great Britain, No. 43,055/63; Oct. 31, 1963, Great Britain, No. 43,056/63; Jan. 10, 1964, Great Britain, No. 1,230/64; Jan. 10, 1964, Great Britain, No. 1,231/64 |

[54] SURFACE MODIFYING TREATMENT OF SHAPED ARTICLES MADE FROM POLYESTERS
6 Claims, No Drawings

| [52] | U.S. Cl. | 117/118, 117/138.8 |
|---|---|---|
| [51] | Int. Cl. | B44d 5/12 |
| [50] | Field of Search | 117/118, 138.8 |

[56] References Cited
UNITED STATES PATENTS

| 3,152,920 | 10/1964 | Caldwell et al. | 117/138.8 |
| 3,31,962 | 5/1965 | Wakeman | 117/138.8 |
| 3,190,718 | 6/1965 | Schoeneberg et al. | 117/138.8 X |
| 3,385,811 | 5/1968 | Carrington et al. | 117/118 X |

Primary Examiner—Ralph S. Kendall
Assistant Examiner—Caleb Weston
Attorney—Cushman, Darby & Cushman ABSTRACT: A process for the treatment of the shaped articles, made from an essentially linear crystallizable polyester, with a water-insoluble crystallizable polymeric compound, wherein said crystallizable polymeric compound contains within a single molecule (A) sufficient repeat units identical with those forming the crystallizable portions of the polyester to confer crystallizability on the compound and (B) at least one active group serving to modify the surface of the shaped article, the said group being selected from at least one of the following: an acidic group and a basic group, the said crystallizable polymeric compound having a melting point above 100° C., measured by the temperature of disappearance of birefringence, and the said treatment being carried out by applying the crystallizable polymeric compound to the surface of the shaped article and subjecting the shaped article with the compound to a thermal treatment at a temperature above 90° C.

SURFACE MODIFYING TREATMENT OF SHAPED ARTICLES MADE FROM POLYESTERS

This is a division of prior U.S. application Ser. No. 370,068, filed May 25, 1964, now U.S. Pat. No. 3,416,952, the disclosure of which is incorporated herein by reference.

According to the present invention we provide a polyester shaped article made from a synthetic crystalline polyester, which is provided with a surface structure containing active groups, said active groups being linked by groups containing ester or amide linkages to polyester repeat units which are identical with those repeat units constituting the crystalline segments of the internal structure of the shaped article, and which are attached to the internal structure of the shaped article by cocrystallization with crystalline polyester segments of the internal structure, said active groups being selected from at least one of the following: acidic groups and basic groups.

Further according to the present invention, we provide a process for the treatment of shaped articles, made from an essentially linear crystallizable polyester, with a water-insoluble crystallizable polymeric compound, wherein said crystallizable polymeric compound contains within a single molecule (A) sufficient repeat units identical with those forming the crystallizable portions of the polyester to confer crystallizability on the compound and (B) at least one active group serving to modify the surface of the shaped article, the said active group being selected from at least one of the following: an acidic group and a basic group, the said crystallizable polymeric compound having a melting point above 100° C., measured by the temperature of disappearance of birefringence, and the said treatment being carried out by applying the crystallizable polymeric compound to the surface of the shaped article and subjecting the shaped article with the compound to a thermal treatment at a temperature above 90° C.

It will be appreciated that the shaped article may contain other materials besides the polyester, for example it may be a fabric blend of polyester with cotton fibers.

Essentially linear crystallizable polyesters which may be treated according to the invention include fiber and film forming polyesters and copolyesters derived from poly(ethylene terephthalate), poly(tetramethylene terephthalate), poly (1,4-bismethylenecyclohexane terephthalate), poly(ethylene naphthalene-2,6-dicarboxylate), and poly(ethylene diphenoxyethane-4,4'-dicarboxylate). In the case of poly(ethylene terephthalate) the crystallizable repeat unit has the structure

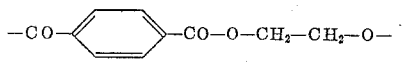

and in copolyesters containing ethylene terephthalate units the crystallizable repeat unit is the same provided that the proportion of ethylene terephthalate units is high enough. Polyesters and copolyesters containing at least 80 moles % of poly(ethylene terephthalate) have proved especially successful commercially. Particular copolymers of poly(ethylene terephthalate) which have found some industrial application and to which this process may be applied include those in which adipate, sebacate, isophthalate, or sulphoisophthalate replace terephthalate; oxydiethylene or poly(oxyethylene) replace ethylene; p-oxyethoxybenzoate or p-oxybenzoate replace terephthalate; pentaerythritol, glycerol, or their derivatives are introduced to form chain-branching sites; or monoalkyl poly(oxyethylene) glycol is introduced to limit chain length. Poly(1,4-bismethylenecyclohexane terephthalate) has also proved successful commercially. By the phrase "essentially linear" we mean that the polyester is either unbranched or exhibits a minor degree of chain branching insufficient to render the polyester insoluble in solvents which dissolve the unbranched polymer.

When we refer to a crystallizable polymeric compound containing sufficient repeat units identical with those forming the crystallizable portions of the polyester being treated to confer crystallizability on the compound, we mean that the compound, whether copolymeric or oligomeric in nature, when examined in the crystalline form produces an X-ray diffraction pattern which contains reflections which are identical with the major reflections produced by the polyester in its crystalline form. It will be appreciated that the X-ray diffraction pattern produced by the compound may also contain additional reflections due to any other crystalline components which may be present. Thus, where the compound used in oligomeric in nature and a mixture of such oligomeric materials is employed, lower molecular weight oligomers may contribute additional reflections to the spectrum or may reinforce certain reflections relative to others; thus for example a low molecular weight polyester with end-groups which are active groups is effectively a mixture of oligomers having active end-groups and may contain for example compounds with insufficient terephthaloyl units per molecule, in addition to those having sufficient terephthaloyl units per molecule to be of use in this invention; the X-ray diffraction pattern of the mixture contains reflections due to these lower molecular weight compounds in addition to those corresponding with the reflections provided by the components which are of use in the invention.

In some cases where the polyester segments (i.e. successions of repeat units) are short and the degree of crystallinity is consequently low, the X-ray diffraction pattern may be observed only with difficulty. The suitability of the compound may be determined by the temperature at which the crystalline birefringence disappears when the crystalline polymer is observed on a hot stage under a polarizing microscope. Thus for example where the only other crystallizable component present has a crystalline melting point below 70° C., if crystalline birefringent material is observed to melt above 100° C. this crystalline material must be derived from the polyester segments. For the copolymer to possess a high durability on the polyester surface the temperature of final loss of birefringence should be above 100° C. and preferably above 150° C. In cases where another crystalline segment is present which melts at a high temperature, for example if a polyester/polyamide block copolymer wherein both the polyester and the polyamide segments are crystallizable is employed, the temperature of final loss of birefrigence is not by itself a sufficient test for the presence or absence of polyester crystallinity and it may then be necessary to examine the X-ray diffraction spectrum of the crystalline material to decide whether polyester crystallinity is present which would make the compound suitable for the treatment of the invention.

The active group present in the crystallizable polymeric compound can be either simple or polymeric, and may be present as an end group in the molecule or may be attached to other groups at one or more than one position. Of course, more than one active group may be present in the molecule of the crystallizable compound, and other groups which confer neither crystallizability nor surface modification may also be present.

The effect of incorporating an acidic group as an active group in the crystallizable polymeric compound is to render the surface of the shaped article receptive to basic materials such as basic polymers and copolymers or basic dyestuffs. The effect of incorporating a basic group as an active group in the crystallizable polymeric compound is to render the surface of the shaped article receptive to acidic materials, such as acidic polymers and copolymers or acid dyestuffs. Acidic or basic groups may be incorporated in the crystallizable polymeric compound in the form of their ionizable salts instead of as the un-neutralized acid or base.

The acidic group or salt thereof may be a relatively weak acid or a salt of a relatively weak acid, such as a carboxylic acid, or it may be a relatively strong acid or a salt of a relatively strong acid, such as a sulfonic or phosphonic acid. Strong acids and their salts are particularly effective in modifying the surface properties of shaped articles.

The acidic group or salt thereof may be derived from a monomeric material; thus for example the crystallizable compound may contain acidic end-groups, such as p-sulphobenzoic ester groups, or acidic difunctional groups such as 5-sulphoisophthalic ester groups. The acid group or salt thereof may be derived from a polymeric material, such as poly(ethylene 5-sulphoisophthalate). The crystallizable compound may be a block or graft copolymer.

In the case where the active group is a basic group or a salt of a basic group, it is preferred that the basic group is nitrogenous. The nitrogenous basic group or groups may be derived from a monomeric material; thus for example the crystallizable compound may contain basic end-groups, such as N,N-dimethyl hydrazide or dimethylaminoethyl ester end-groups, or basic difunctional groups such as N-methyl-diethanolamine ester groups. The nitrogenous basic group or groups may be derived from a polymeric material, such as polyethyleneimine or a poly-(aminotriazole), in which case the crystallizable compound may be a block or graft copolymer. The nitrogenous basic group or groups may contain primary, secondary, tertiary, or quaternary basic groups.

It is a feature of the invention that it is not necessary that the crystallizable polymeric compound used in the treatment should itself be capable of forming shaped articles such as fibers or films, and indeed we prefer to use a crystallizable polymeric compound which is not itself capable of forming fibers, although crystallizable polymeric compounds which are capable of forming shaped articles can be used.

A single crystallizable polymeric compound of definite molecular weight may be employed, and we have for convenience referred to such single compounds as being oligomeric in nature although it will be appreciated that such single crystallizable compounds are not true oligomers since they contain active groups as herein-defined. It is however much more convenient to prepare and use a mixture of crystallizable polymeric compounds of varying molecular weight such as is obtained by condensation polymerization of the precursors of the crystallizable repeat units with precursors of the active groups, or by degradation of preformed crystallizable polyester with a precursor of an active group. Thus example 1 shows how a suitable crystallizable polymeric compound containing acidic sulphoisophthalate active groups may be prepared by condensation polymerization, and example 3 shows how a suitable crystallizable polymeric compound containing basic dimethylhydrazide active groups may be prepared by degradation of preformed crystallizable polyester. We prefer to use a mixture of crystallizable polymeric compounds of varying molecular weight rather than a single crystallizable polymeric compound of definite molecular weight but where we refer to a crystallizable polymeric compound we mean to include within the meaning of the term both a single compound of definite molecular weight and a mixture of crystallizable polymeric compounds differing in molecular weight but containing the same component groups.

The crystallizable polymeric compound may be a linear polymer or a branched-chain polymer. In the case where it is a branched-chain polymer, branching is obtained by incorporating chain-branching sites into groups which are derived from copolymerizable compounds having a functionality of three or more. By the functionality of a compound we mean the number of reactive functional groups per molecule. Thus a compound having three reactive functional groups per molecule is said to be trifunctional, or to have a functionality of three. Trimethylolpropane and trimethyl trimesate are examples of trifunctional compounds suitable for use in the preparation of branched crystallizable polymeric compounds by condensation polymerization. Polymeric copolymerizable compounds having a functionality of three or more may be employed to introduce branched chains, and these may also contain active groups, as is the case with glycerol-ethylene oxide or pentaerythritol-ethylene oxide condensates which have functionalities of three and four respectively.

The crystallizable polymeric compound may be a random copolymer, or it may be a block copolymer, or it may be a graft copolymer. In general, where the active group is itself polymeric, the crystallizable polymeric compound will be a block or graft copolymer, and where the active group is not polymeric the crystallizable polymeric compound will usually be a random copolymer, but may alternatively be a block or graft copolymer. Where the active group is not polymeric and appears only as end-groups in the crystallizable polymeric compound, as in example 3, the crystallizable polymeric compound is not strictly a copolymer at all, but rather a homopolymer with active end-groups.

It is of course possible to apply a crystallizable polymeric compound containing more than one active group, or to apply together or consecutively two or more crystallizable polymeric compounds containing different active groups.

The crystallizable polymeric compound or compounds may be applied to the shaped article as molten material, or as a solution in a plasticizer for the polyester being treated, or as a solution in a solvent which does not plasticize the polyester being treated, or as a suspension or dispersion of the compound or compounds in a liquid medium. A particularly simple method of applying the compound or compounds is from a dispersion in water or an aqueous medium, and this is a particularly preferred method of application.

It will be appreciated that although it is essential for the purpose of this invention that the polymeric compound be crystallizable, it is not essential that the polymeric compound be applied to the surface of the shaped article in a crystalline form. Thus where the crystallizable polymeric compound is applied in molten or dissolved form, it is not crystalline during the application. Similarly, although it is essential for the purpose of this invention that the shaped article contain or comprise an essentially linear crystallizable polyester, it is not essential that the crystallizable polymeric compound be applied to the surface while the shaped article is in the crystalline form. In such cases, of course, it is necessary for crystallinity to be developed in the crystallizable polymeric compound and in the shaped article subsequent to the application.

In order to produce a durable surface treatment it is essential to heat the compound in contact with the surface of the shaped article. Where a solution or dispersion of the crystallizable polymeric compound is used, the solvent or continuous phase may be removed by the same or by a previous thermal treatment, or may be allowed to evaporate before thermal treatment. The compound may also be applied directly from a continuous phase, for example by using techniques normally applied for dyeing with disperse dyestuffs. The temperature required to produce a durable surface treatment is above 90° C. and preferably the temperature should exceed 150° C. Obviously, the temperature should not be so high as to melt or damage the shaped article, so temperatures above the melting point of the shaped article can only be applied for very short times.

It is useful, particularly when the active group or groups is affected by atmospheric oxygen at the temperature of the thermal treatment, to carry out the thermal treatment with an anti-oxidant present. This anti-oxidant may be present as an active group in a crystallizable polymeric compound. It may alternatively be present as a separate compound dissolved or dispersed in the treating composition.

The following examples, in which all parts and percentages are by weight, illustrate but do not limit our invention.

EXAMPLE 1

This illustrates the preparation of and treatment with a crystallizable polymeric compound containing active groups which are salts of an acid, namely sodium sulpho-isophthalate.

Dimethyl terephthalate (53.7 parts) dimethyl sodium sulphoisophthalate (9.1 parts) ethylene glycol (43 parts), calcium acetate hemihydrate (0.049 part) and antimony trioxide (0.025 part) were mixed and heated together; methanol was evolved, and distilled off until the theoretical amount of methanol had been removed. Phosphorous acid (0.09 part) was added, and excess glycol was distilled off and the residue polymerized under reduced pressure at 282° C. until a polymer with Viscosity Ratio of 1.42 (measured on a 1% solution in o-chlorophenol at 25° C. ) was obtained. This polymer contained enough poly(ethylene terephthalate) repeat units to crystallize; the X-ray diffraction pattern was characteristic of a polymer containing poly(ethylene terephthalate) in crystalline form.

The polymer was dispersed in water to give a 10% dispersion, and the dispersion was padded on to a 100% 'Terylene' R.T.M. taffeta fabric, which was mangled and baked in an oven to give 3% solids by weight on the fabric. Baking temperatures and times ranged from 150°–200° C. and from 5–10 minutes. The treated fabric had a crisp handle and was resistant to deformation. It dyed readily on the surface with basic dyes, such as Malachite Green, to give a uniform deep green color.

Samples of the treated fabric were subjected to 30 wash-dry cycles each consisting of a 6-minute -minute wash in 0.07% 'Perisl' (R.T.M.) detergent solution at 60° C. in a 'Hoover' washing machine, rinsing in water, three spin-dry treatments, and drying in a hot air tumbler drier at 60° C. After the final wash-dry cycle, the fabrics still retained a crisp handle and were surface dyed by Malachite Green; this demonstrated that the surface treatment was very durable to washing. Untreated 'Terylene' fabric was not dyed by Malachite Green.

EXAMPLE 2

This illustrates the preparation of and treatment with a crystallizable polymeric compound containing two active groups, namely a water solvatable polyoxyethylene group and a salt of an acid group, which is sodium sulphoisophthalate.

Dimethyl terephthalate (77.6 parts), ethylene glycol (62 parts), Carbowax 1540 polyethylene glycol (77 parts), dimethyl sodium sulphoisophthalate (14.8 parts), calcium acetate hemihydrate (0.06 part), antimony trioxide (0.03 part), and 2,6-dimethyl-4-$\alpha$-methyl cyclohexyl phenol (0.077 part) were reacted with evolution of methanol then polymerized as in example 1 until a polymer with a Viscosity Ratio of 1.25 (measured on a 1% solution in o-chlorophenol at 25° C.) was obtained. This polymer contained enough poly(ethylene terephthalate) units to crystallize.

The polymer was dispersed in water to give a 5% dispersion, 2% of pyrogallol (based on the polymer) was added, and the dispersion was padded on to a 100% poly(ethylene terephthalate) taffeta fabric, which was mangled and baked at 180° C. for 5 minutes to give 2.8% by weight of polymer on the fabric. The fabric had an electrical resistance of $2.1 \times 10^4$ megohms (measured lengthwise on a sample $7'' \times 1\frac{1}{2}''$ at 65% Relative Humidity). After 10 wash-dry cycles as described in example 1, the fabric was rinsed in water of conductivity $1.5 \times 10^{13}$ megohms spin dried for 2 minutes, and tumbler dried at 60° C. The electrical resistance was $2.7 \times 10^4$ megohms. After further 20 washes, the resistance had risen to only $1.7 \times 10^5$ megohms, compared with over $10^7$ megohms for untreated fabric. The surface treatment therefore exhibited high durability towards washing.

EXAMPLE 3

This illustrates the preparation of and treatment with a crystallizable polymeric compound containing an active group which is a basic group, namely dimenthylhydrazide and which is present as an end group. This also illustrates the preparation of a crystallizable polymeric compound by degradation of a preformed polyester.

Dimethyl terephthalate (97 parts), ethylene glycol ( parts), calcium acetate (0.075 parts), and antimony trioxide (0.04 parts) were mixed and caused to ester interchange until no more methanol was evolved. After ester interchange, phosphorous acid (0.035 parts) was added, followed by N,N-di-methyl hydrazine (20 parts) dissolved in ethylene glycol (80 parts). Excess glycol was removed rapid distillation under reduced pressure at 192° C. with nitrogen passing through the molten mixture. The product was extruded, and found to have a Viscosity Ratio of 1.08 (determined in a 1% solution in orthochlorophenol at 25° C.), and a melting point of 115°–145° (measured by noting the range over which the sample lost birefringence on the hot stage of a polarizing microscope).

The product was readily dispersed in water by milling it with gravel; a 6% dispersion was prepared, applied to a 100% poly(ethylene terephthalate) taffeta fabric by padding and mangling, and baked on at 180° C. for 5 minutes. The fabric was now readily dyeable on the surface by acid dyes, but color was removed by scouring with 5% aqueous sodium carbonate. The fabric had an electrical resistance of $1.05 \times 10^5$ megohms (measured on a sample $7'' \times 1\frac{1}{2}''$ at 65% Relative Humidity). After 10 wash-dry cycles each consisting of a 6-minute wash in a 0.07% detergent Persil' (R.T.M.) solution at 60° C. in a Hoover' washing machine, rinsing in water, three spin-dry treatments, and drying in a hot air tumbler dried at 60° C. the fabric was rinsed in water of conductivity $1.5 \times 10^{13}$ megohms spin dried for 2 minutes, and tumbler dried at 60° C. The electrical resistance was $3.2 \times 10^5$ megohms. After further 20 washes the resistance had risen only to $5.6 \times 10^5$ megohms. These results indicate that the surface treatment shows high durability to washing and provides useful antistatic activity. After 30 washes the fabric was still surface-dyed by acid dyes, for example carbolan' Regd. T.M. Blue B; the color was removed by scouring with alkali, but not by washing with water or with detergent solution as above.

EXAMPLE 4

This illustrates the preparation of and treatment with a crystallizable polymeric compound containing an active group which is a basic group, namely polyethylene-N-methyl imino diacetate.

A block copolymer of poly(ethylene terephthalate) with poly(ethylene N-methyl imino diacetate) was prepared by heating the homopolymers, of Viscosity Ratios respectively 1.11 and 1.07 (1% solution of polymer in o-chlorophenol, at 25° C.), together in the ratio 192.173 at 282° C. for 5 minutes under nitrogen. The copolymer was crystalline, the crystallinity being due to the poly(ethylene terephthalate) units. The copolymer was dispersed in water by ball-milling to give a dispersion containing 10% of copolymer. The dispersion was applied to a 100% poly-(ethylene terephthalate) taffeta fabric as described in example 1. The fabric was now readily dyeable on the surface with acid dyes, but color was removed by scouring with alkali. After 30 washes, carried out as described in example 1, the fabric was still readily dyeable on the surface by acid dyes indicating that the surface treatment was very durable to washing.

What we claim is:

1. A shaped article made from a synthetic essentially linear crystalline polyester which is provided with a surface structure containing active groups selected from the class consisting of organic nitrogenous basic groups, organic acidic groups and salts thereof, said active groups being linked by groups containing a member of the class consisting of ester and amide linkages to polyester repeat units which are identical with those repeat units constituting the crystalline segments of the internal structure of the shaped article, and which are attached to the internal structure of the shaped article by cocrystallization with the crystalline polyester segments of the internal structure.

2. A process for providing a shaped article made from a synthetic essentially linear crystalline polyester which is provided with a surface structure containing active groups selected from the class consisting of organic acidic groups, organic nitrogenous basic groups and salts thereof, said active groups being linked by groups containing a member of the class consisting of ester and amide linkages to polyester repeat units which are identical with those repeat units constituting the crystalline segments of the internal structure of the shaped article, and which are attached to the internal structure of the shaped article by cocrystallization with the crystalline polyester segments of the internal structure, comprising:

subjecting a shaped article of synthetic essentially linear crystallizable polyester to a thermal treatment at a temperature above 90° C. and below the melting temperature of the shaped article while the said shaped article is in intimate contact with a water-insoluble crystallizable polymeric compound, said polymeric compound being characterized in that (A) it has a crystalline melting point above 100° C., measured by the temperature of disappearance of birefringence, (B) it contains crystallizable segments of repeat units identical with the repeat units forming the crystallizable portions of the polyester shaped article, and (C) it contains at least one of said active groups linked to the crystallizable segments in (B) by groups containing a member of the class consisting of ester and amide linkages said polyoxyalkylene groups serving to modify the surface of the shaped article.

3. A shaped article as set forth in claim 1 in which the basic groups are selected from the group consisting of N,N-dimethyl hydrazide end groups, dimethylaminoethyl ester end groups, N-methyl-diethanolamine ester groups, polyethyleneimine groups and poly(aminotriazole) groups.

4. A shaped article as set forth in claim 1 in which the acidic groups are selected from the group consisting of carboxylic acid, sulfonic acid and phosphonic acid.

5. A process as set forth in claim 2 in which the basic groups are selected from the group consisting of N,N-dimethyl hydrazide end groups, dimethylaminoester end groups, N-methyl-diethanolamine ester end groups, polyethyleneimine groups and poly(aminotriazole) groups.

6. A process as set forth in claim 2 in which the acidic groups are selected from the group consisting of carboxylic acid, sulfonic acid and phosphonic acid.

* * * * *